(No Model.)
W. M. FARR.
SAND BAND.
No. 526,075. Patented Sept. 18, 1894.
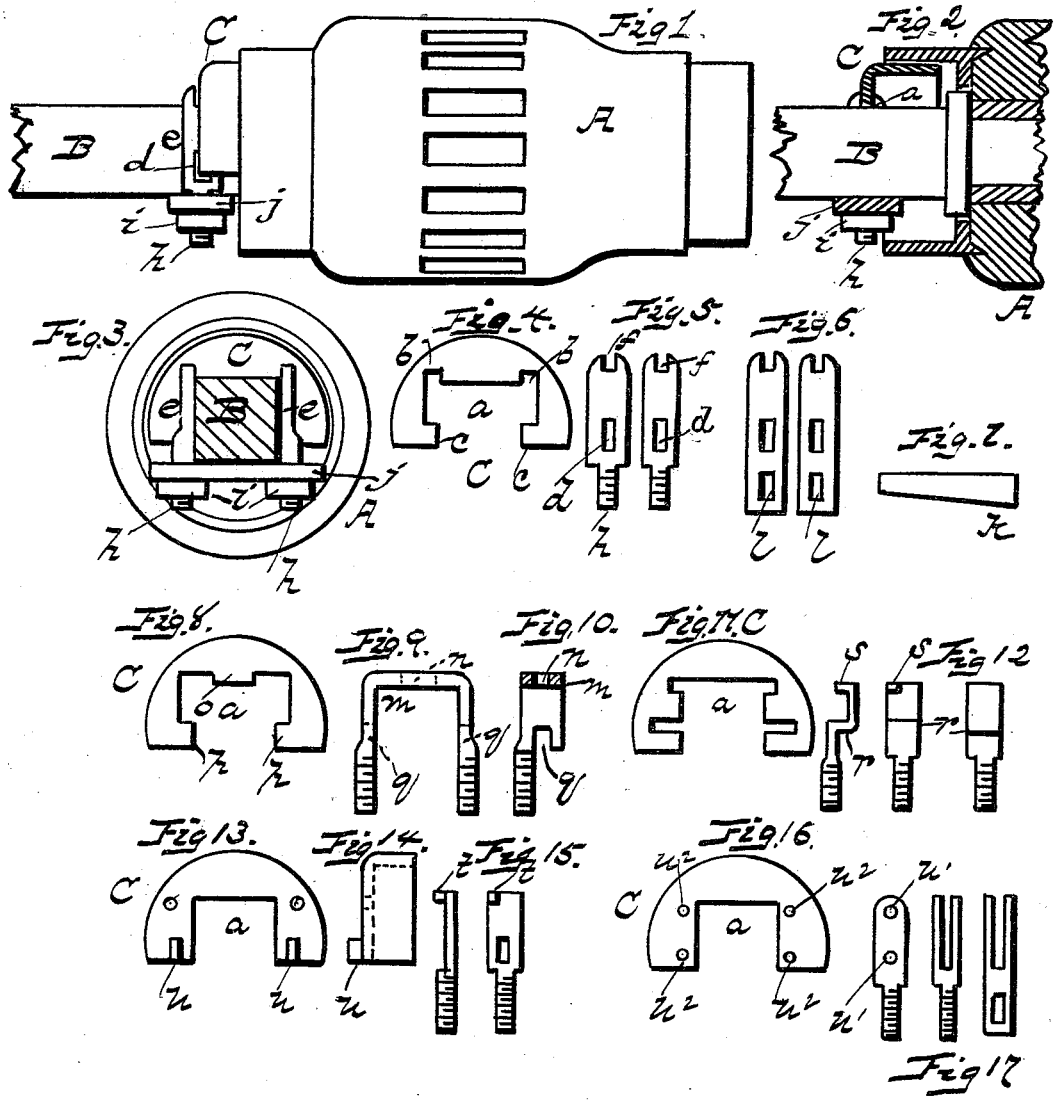

UNITED STATES PATENT OFFICE.

WILLIS M. FARR, OF DOWAGIAC, MICHIGAN.

SAND-BAND.

SPECIFICATION forming part of Letters Patent No. 526,075, dated September 18, 1894.

Application filed April 24, 1894. Serial No. 508,771. (No model.)

*To all whom it may concern:*

Be it known that I, WILLIS M. FARR, a citizen of the United States, residing at Dowagiac, in the county of Cass, State of Michigan, have invented certain new and useful Improvements in Sand-Bands, of which the following is a specification, reference being had therein to the accompanying drawings.

The object of my invention is to improve the construction of sand bands and more particularly the manner of securing the parts to the hub or axle or both.

The invention consists in the novel construction and combination of parts hereinafter fully described and specifically pointed out in the claim and are made cast or forged metal having parts of cap, plates, key, bolts and clip to be used in modified forms.

In the annexed drawings, to which reference is made Figure 1 represents a side view of a hub showing my device applied thereto. Fig. 2 is a vertical detail sectional view of the same. Fig. 3 is a rear view. Fig. 4 is a rear view of the hood. Fig. 5 is a face view of the two arms. Fig. 6 is a similar view showing the arms in modified form. Fig. 7 is a side view of the wedge used in connection with arms shown in Fig. 6. Fig. 8 is a rear view of the hood in modified form. Fig. 9 is a face view of the arms in yoke form and otherwise modified. Fig. 10 is a vertical cross sectional view of the same. Fig. 11 is a rear view of the hood in modified form. Fig. 12 represents respectively a side, front and rear view of the arms in modified form. Fig. 13 is a rear view of the hood showing the same in still another modified form. Fig. 14 is a side view of the same. Fig. 15 shows the two arms in modified form adapted to be used with the hood shown in Figs. 13 and 14. Fig. 16 is a rear view of the hood in modified form and Fig. 17 is a side, edge and face view of the arms adapted to be used in connection with the hood, shown in Fig. 16.

Referring by letter to the accompanying drawings A, designates a vehicle hub and B, represents the axle thereof.

C, indicates the hood or cap for the axle and is designed to prevent sand or dirt from getting into the hub and upon the spindle of the axle. This cap or hood is designed to cover or be covered by any projecting rim, band or device used on hubs at the inner end or by enlarging to cover the end of the hub itself with attachments thereto and in the manufacture of it I do not confine myself to the particular form and shape shown in the drawings, but modify its shape to conform with the shape and size of the axle or hub; the space for adjusting it and the attachment which it is designed to cover or be covered. This hood is permanently attached to the axle by adjusting arms and lugs and slots formed integral with the hood and arms, whereby each can be readily secured to one another and to the axle. The hood C, is cut away as at $a$ to straddle the axle and at the upper portion thereof are two notches $b$, $b$, while at the lower portion and extending inwardly are two lugs $c$, $c$, which engage slots $d$, $d$, in the arms $e$, $e$, while the upper ends of said arms, by their notches $f$, $f$, engage notches $b$, $b$, in the hood. These side arms having the notches and slots are provided with the screw threaded ends $h$, $h$, to receive the securing nuts $i$, $i$, by which the plate $j$, arms and hood are secured to the axle. These screw ends and nuts may be dispensed with and a wedge $k$ driven beneath the axle and through slots $l$, $l$, in the lower ends of the arms, for securing the same to the axle as shown in Figs. 6 and 7 of the drawings.

Figs. 9 and 10 which are modifications of the side arms $e$ $e$, show the arms in yoke or clip form, the upper cross bar $m$ of which has a slot $n$ in which the lug $o$ of the modified hood fits and the lugs $p$, $p$, of said hood engage open slots $q$, $q$ in the arms, thus firmly holding the clip to the hood.

Fig. 11 shows the hood in still another modified form and is provided with notches which are horizontally arranged to engage the bent portion $r$ and upper bent portion $s$ of the arms of modified form and Fig. 13 shows the hood in modified form having a perforation to receive the stud $t$ and lugs $u$, which engage the slot in the arms in the modification shown in Fig. 15.

Fig. 17, shows a modification of the clamping arms, having a forked arm having holes $u'$ transversely through the forked portion and adapted to receive rivets which also pass through perforations $u^2$ in the hood of modified form shown in Fig. 16. This forked arm can be provided with a slot in its lower end for a wedge to enter or can be screw threaded to receive a nut by which it is secured to the axle.

In applying the device I use according to the mechanical construction of various vehicle hubs and axles, straight or bent arms notched to fit corresponding parts in the hood, slotted to fit over lugs or with holes for riveting, threaded at the ends, with nuts applied, or slotted ends for receiving a wedge or key for the purpose of securing the hood to the axle as described, and a sand band as herein described is easily attached and detached from an axle and it is durable as well as cheap to manufacture.

What I claim is—

In a sand band, the hood having the notches b, lugs c, in combination with the plates, having the slot d and notch f, said plates connected by the crossplate j and secured in position by nuts all substantially as shown and described.

In testimony whereof I affix my signature in presence of two witnesses.

WILLIS M. FARR.

Witnesses:
WILLIAM M. VROOMAN,
F. W. VAN ANTWERP.